US006799209B1

(12) United States Patent
Hayton

(10) Patent No.: US 6,799,209 B1
(45) Date of Patent: Sep. 28, 2004

(54) ACTIVITY MONITOR AND RESOURCE MANAGER IN A NETWORK ENVIRONMENT

(75) Inventor: Richard Hayton, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 09/578,779

(22) Filed: May 25, 2000

(51) Int. Cl.[7] .............................................. G06F 13/00
(52) U.S. Cl. ...................... 709/223; 709/203; 709/217; 709/226
(58) Field of Search ................................ 709/200, 201, 709/203, 217, 218, 219, 223, 224, 225, 226

(56) References Cited

U.S. PATENT DOCUMENTS

| | | | |
|---|---|---|---|
| 5,249,290 A | 9/1993 | Heizer | 395/650 |
| 5,341,477 A | 8/1994 | Pitkin et al. | 395/200 |
| 5,473,599 A | 12/1995 | Li et al. | 370/16 |
| 5,526,492 A | 6/1996 | Ishida | 395/200.09 |
| 5,623,603 A | 4/1997 | Jiang et al. | 395/200.04 |
| 5,630,757 A | * 5/1997 | Gagin et al. | |

(List continued on next page.)

FOREIGN PATENT DOCUMENTS

| | | |
|---|---|---|
| EP | 0 384 339 A2 | 8/1990 |
| EP | 0 442 839 A2 | 8/1991 |
| EP | 0 540 151 A2 | 5/1993 |
| JP | 6-332782 | 12/1994 |
| WO | 06332782 | 12/1994 |
| WO | 0 648 038 A2 | 4/1995 |
| WO | EP 0 715 257 A1 | 6/1996 |
| WO | WO 98/52320 | 11/1998 |
| WO | WO 98/52344 | 11/1998 |
| WO | WO 99/30495 | 6/1999 |

OTHER PUBLICATIONS

*Windows NT Networking Guide: Microsoft Windows NT Resource Kit*, pp. 79–87, Microsoft Press 1995.
Abstract of Schemers, R.J. III, "Ibnamed: a load balancing name server in Perl," published by USENIX Assoc. in *Proceedings of the 9th USENIX Systems Administration Conference*, Berkeley, CA.
IBM Technical Disclosure Bulletin, "Changing System Configuration for Shared Windows Applications", vol. 37, No. 2B, p. 505/506, Feb. 1, 1994.
"Workstation Load Leveling Technique Using Buffer Allocation," *IBM Technical Disclosure Bulletin*, vol. 30, No. 7, Dec. 1987, pp. 357,359.

(List continued on next page.)

*Primary Examiner*—Moustafa M. Meky
(74) *Attorney, Agent, or Firm*—Lahive & Cockfield LLP; John D. Lanza, Esq.

(57) ABSTRACT

An apparatus and method for monitoring the activity level of a user by the client and managing the network resources, including server resources, in response to the level of activity identified by the client. In one embodiment the invention relates to a method for managing network resources, in response to the level of activity identified by the client. In another embodiment the invention relates to a system for managing network resources, in response to the level of activity identified by the client. In still yet another embodiment the invention related to a server for managing resources allocated to an external client, in response to the level of activity identified by the client.

29 Claims, 4 Drawing Sheets

U.S. PATENT DOCUMENTS

| | | | |
|---|---|---|---|
| 5,644,720 A | | 7/1997 | Boll et al. .............. 395/200.12 |
| 5,652,909 A | | 7/1997 | Kodosky ........................ 717/1 |
| 5,659,685 A | | 8/1997 | Williams et al. .......... 395/200.5 |
| 5,684,861 A | | 11/1997 | Lewis et al. ................... 379/59 |
| 5,771,353 A | * | 6/1998 | Eggleston et al. |
| 5,774,642 A | | 6/1998 | Flon et al. ............. 395/182.11 |
| 5,802,292 A | | 9/1998 | Mogul ................... 395/200.33 |
| 5,862,348 A | | 1/1999 | Pedersen ............... 395/200.59 |
| 5,946,465 A | * | 8/1999 | Chmielewski et al. |
| 5,958,006 A | * | 9/1999 | Eggleston et al. |
| 5,964,839 A | | 10/1999 | Johnson et al. ............. 709/224 |
| 6,035,332 A | | 3/2000 | Ingrassia, Jr. ............... 709/224 |
| 6,038,596 A | | 3/2000 | Baldwin et al. ............ 709/219 |
| 6,101,531 A | * | 8/2000 | Eggleston et al. |
| 6,104,705 A | * | 8/2000 | Ismail et al. |
| 6,119,098 A | * | 9/2000 | Guyot et al. |
| 6,138,155 A | * | 10/2000 | Davis et al. |
| 6,237,039 B1 | * | 5/2001 | Perlman |
| 6,301,609 B1 | * | 10/2001 | Aravamudan et al. |
| 6,317,761 B1 | * | 11/2001 | Landsman et al. |
| 6,330,607 B1 | * | 12/2001 | Chmielewski et al. |
| 6,466,967 B2 | * | 10/2002 | Landsman et al. |
| 6,539,429 B2 | * | 3/2003 | Rakavy et al. |
| 6,643,696 B2 | * | 11/2003 | Davis et al. |

OTHER PUBLICATIONS

"OS/2 EE Database Manager SQLJRA Remote Protocol," *IBM Technical Disclosure Bulletin*, vol. 36, No. 1, Jan. 1993, pp. 33–36.

Mann, Bruce E., et al., "Terminal Servers on Ethernet Local Area Networks," *Digital Technical Journal*, No. 3, Sep. 1986, pp. 73–87.

"Specifying a Browser Computer," Part 1, Chapter 5, pp. 79–87.

Schemers, R.J., III, "Ibnamed: a load balancing name server in Perl," *Proceedings of the Ninth Systems Administration Conference (LISA IX)*, 1995, pp. 1–11.

Adler, Richard M., "Distributed Coordination Models for Client/Server Computing," *Computer*, April 1995, pp. 14–22.

* cited by examiner

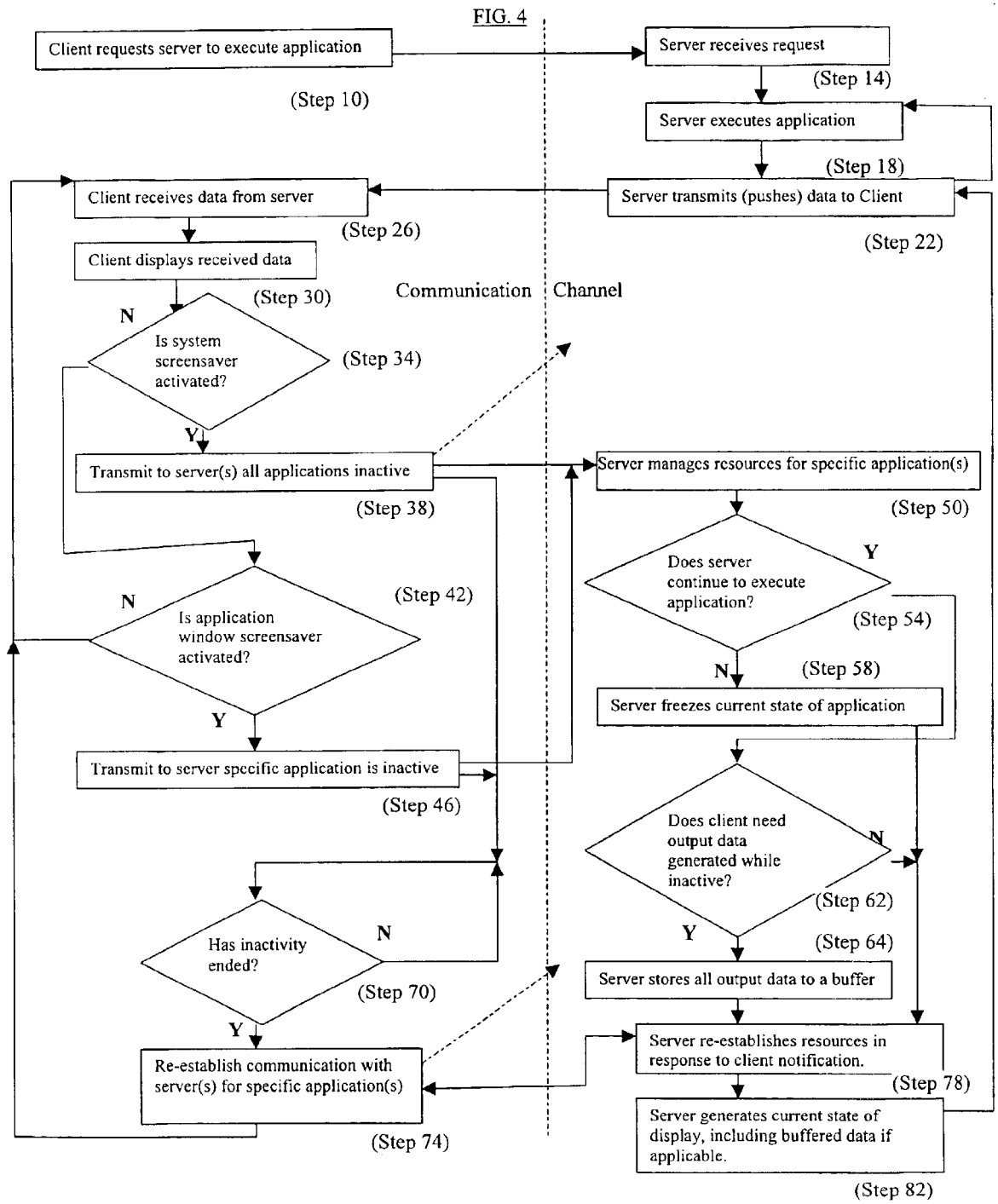

ACTIVITY MONITOR AND RESOURCE MANAGER IN A NETWORK ENVIRONMENT

FIELD OF THE INVENTION

The present invention relates generally to apparatus and methods for resource management in a client/server environment and more specifically to an apparatus and method for managing resources on the server and network in response to monitored activity on the client.

BACKGROUND OF THE INVENTION

Computer communication networks typically include one or more nodes termed server nodes and one or more nodes termed client nodes. A server provides a service to a client upon receiving a request from the client. An example of a service is the execution, on the server, of an application with which the user of the client wants to interact.

Once a client has established a connection with the server, the server allocates certain necessary server resources to that client to perform the requested services. For example, these server resources may include resources necessary to maintain the connection between the client and resources and resources necessary to execute the requested application. Once these resources are allocated to this client, they are not available for another client that subsequently connects to the server.

A problem that arises is that the server continues to allocate these resources even though the user is inactive on the client. This typically occurs with application where the server is continually updating the client with information, "server push" applications, and thus is neither monitoring nor detecting client inactivity. Another problem is that if the server does monitor client inactivity and terminates communication resources in response to this server monitoring, the server may not be able to easily reestablish communication. For example, firewall security will typically prohibit the server from reestablishing communication, and thus the client will have to reestablish communication. Typically it will appear to the user of the client that he is establishing a new connection and repeating the process over from the beginning. These problems create a need for managing server resources in response to the actual user activity level on the client.

The present invention addresses this need.

SUMMARY OF THE INVENTION

The invention relates to an apparatus and method for monitoring, by a client node, the activity level of a user on the client and managing, by a server, the network resources, including server resources, in response to the level of activity identified by the client. This combination allows the server to manage its resources in the most efficient manner while at the same time creating a substantially seamless interaction with the user on the client, in response to the user's activity level.

In one embodiment the invention relates to a method for managing network resources. The method includes the steps of allocating on a server at least one server resource to a client; monitoring activity of a user by the client to detect a change in the level of activity; transmitting to the server from the client a notification of change of activity; and managing the at least one allocated server resource on the server in response to the notification. In one embodiment the notification of change of activity is in response to user inactivity. In another embodiment the method further includes the step of storing state of the at least one allocated server resource, when the notification is received, for resumption at substantially the same state in response to a subsequent notification of change of activity. In another embodiment the method further includes the steps of terminating transmission of output data to the client associated with an application executing on the server in response to the notification; storing the output data in a storage area following the notification; and transmitting the stored output data to said client in response to a subsequent notification of change of activity. In yet another embodiment the method includes the step of reducing the at least one allocated server resource on the server in response to the notification.

In another embodiment the invention relates to a system for managing network resources. The system includes a server including a resource manager and a server communication link in communication with the resource manager, and a client in communication with the server. The client includes an activity monitor and a client communication link in communication with the activity monitor. The client activity monitor detects a level of activity of a user on the client and in response to a change in the activity transmits over the communication link to the server a notification of change of activity. The server resource manager, in response to the notification, manages server resource associated with the client. In one embodiment the notification of change of activity represents user inactivity. In another embodiment the server further includes a server first storage buffer in communication with the resource manager. The server stores output data generated by an application in the first storage buffer in response to the notification. In another embodiment the server transmits the output data, stored in the first storage buffer, to the client in response to a subsequent notification of change of activity. In yet another embodiment the server further includes a server second storage buffer in communication with the resource manager. The server stores the state of the allocated resource, when the notification is received, for resumption at substantially the same state in response to a subsequent notification of change of activity. In still yet another embodiment the invention relates to a client for monitoring user activity. The client includes an activity monitor and a communication link in communication with the activity monitor. The client activity monitor detects a level of activity of a user on the client and in response to a change in the level of activity transmits, over the communication link to an external server, a notification of change of activity. In one embodiment the notification of change of activity represents user inactivity. In another embodiment the client communication link initiates reestablishing communication with the server in response to the notification. In still yet another embodiment the activity monitor further includes a notification generator; an inactivity timer in communication with the notification generator; and user detection I/O in communication with the inactivity timer and the notification generator. The user detection I/O detects lack of activity of a user on the client and transmits the result of the detection to the inactivity timer. In response to the result, the inactivity timer starts counting until it is either reset by detection of activity by the user I/O or counts to a predetermined value. The notification generator, in response to the inactivity timer reaching the predetermined value transmits, over the communication link to an external server, a notification of change of activity.

In still yet another embodiment the invention related to a server for managing resources allocated to an external client The server includes a resource manager and a communication link in communication with the resource manager. The server resource manager, in response to a notification of change of activity from an external client received over the communication link, manages the server resource associated with the external client. In anther embodiment the notification of change of activity represents user inactivity. In another embodiment the server further includes a first storage buffer in communication with the resource manager. The server stores output data generated by an application in the first storage buffer in response to the notification.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 4 is a flow chart depicting of an embodiment of a process of the invention by which a client monitors for inactivity, notifies the server of the inactivity and the server reacts in response to client inactivity.

DETAILED DESCRIPTION OF PREFERRED EMBODIMENTS

Figure 1:
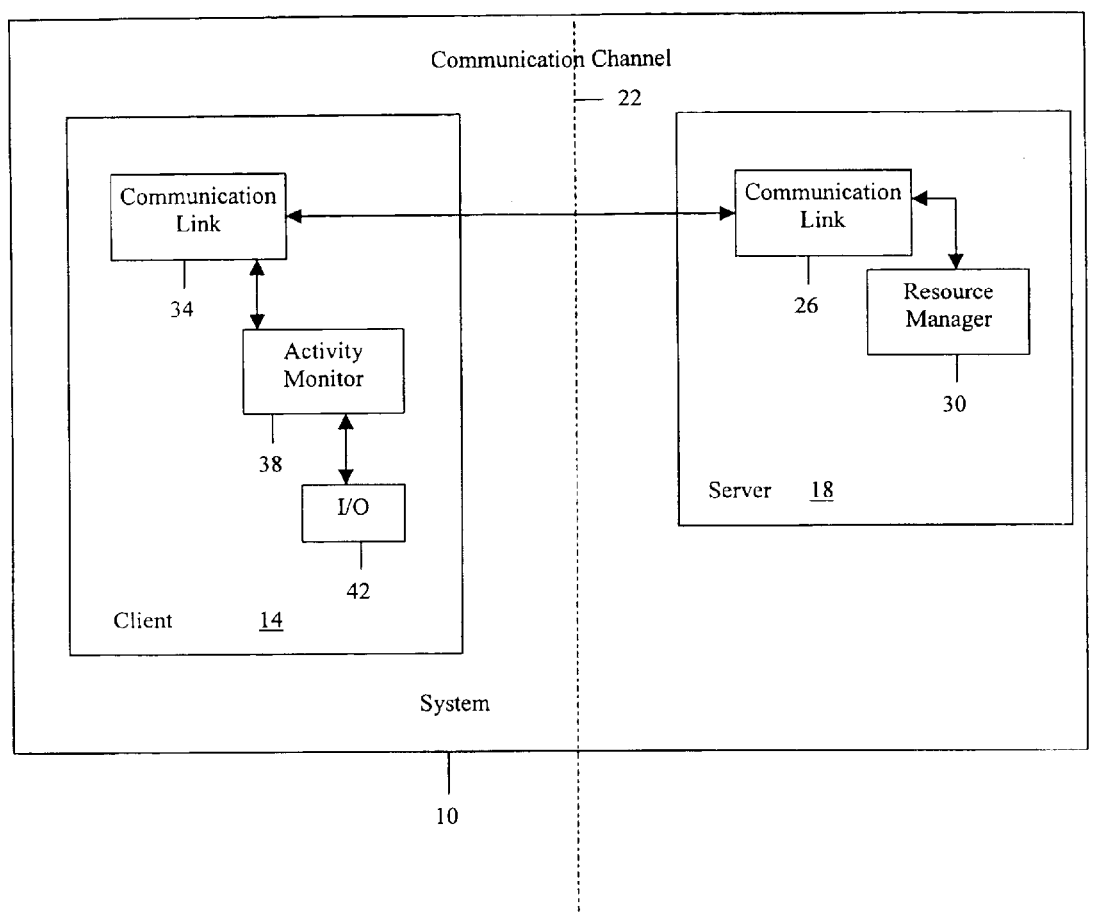
FIG. 1 is a high level block diagram of an embodiment of the invention.

In broad overview, FIG. 1 depicts a system 10 in which a client 14 and a server 18 communicate with each other over a communication channel 22, using the server communication link 26 and the client communication link 34. Once a client 14 establishes communication with the server 18 and requests a service, a resource manager 30 allocates the necessary resources to maintain the communication with the client 14 and perform the requested service.

An activity monitor 38 monitors the user activity on the client 14 through the user detection I/O 42, which is described in more detail below. When the activity monitor 38 detects that the user has not been active on the client 14 for a predetermined period of time, the activity monitor 38 generates a notification of change of activity, representing user inactivity. The activity monitor 38 transmits the notification to the client communication link 34. Once a notification of activity has been generated, the activity monitor 38 continues to monitor the user detection I/O 42 for resumption of activity by the user. Upon detection, the activity monitor 38 generates a notification of change of user activity, representing user activity. The activity monitor 38 transmits the notification to the client communication link 34.

the client communication link 34 transmits the notification, representing either activity or inactivity, to the server communication link 26, which in turn transmits the notification to the resource manager 30. In response to the notification 46, the resource manager 30 manages the allocated resources as applicable, as is described in more detail below.

Figure 2:
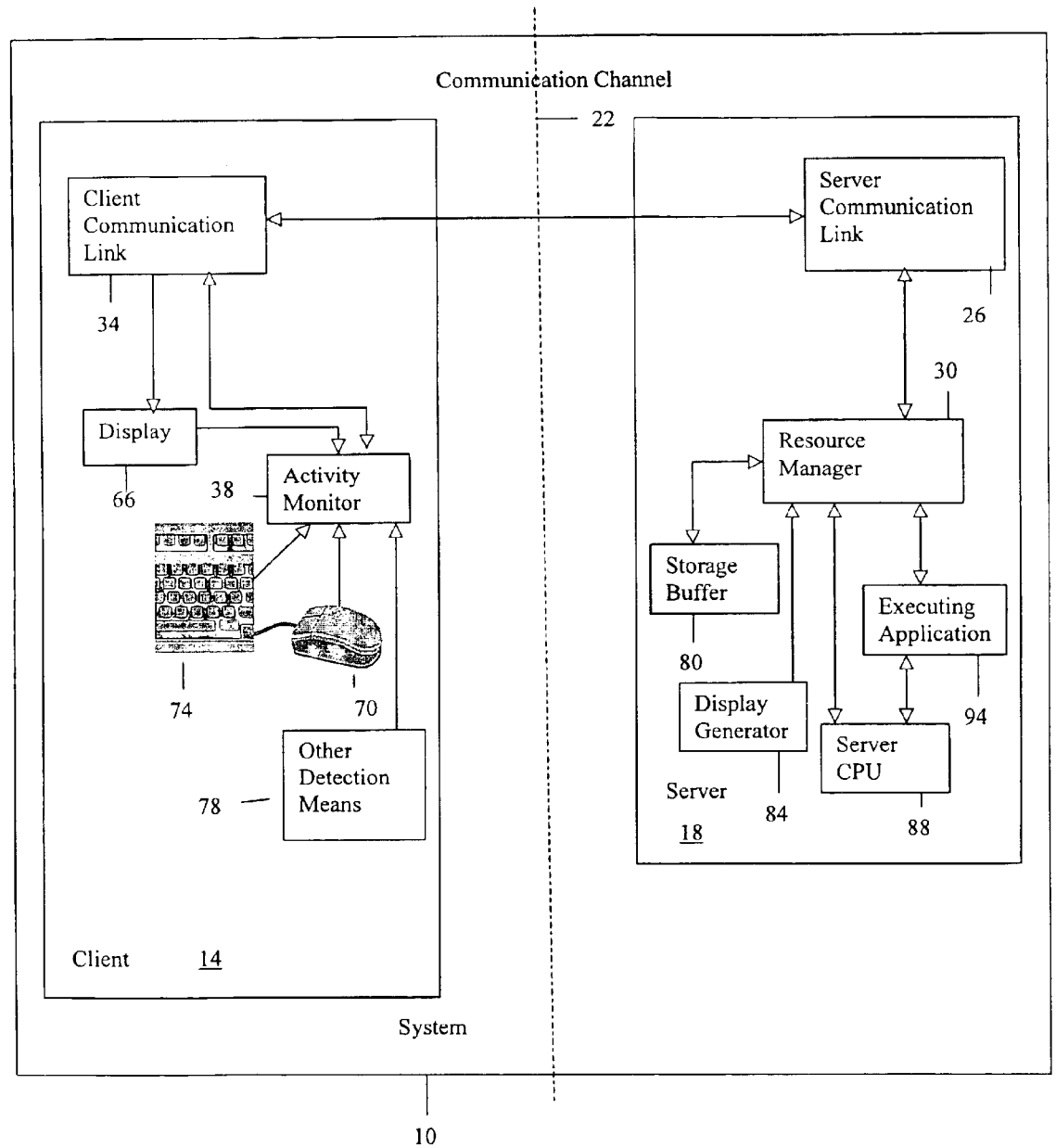
FIG. 2 is a more detailed block diagram of an embodiment of the invention shown in FIG. 1.

FIG. 2 depicts the server 18 and the client 14 in more detail. In one embodiment, the user detection I/O 42 (FIG. 1) with which the activity monitor 38 interacts includes a keyboard 74 and/or a mouse 70. The activity monitor 38 simply monitors the drivers of these devices to verify that there is a user interacting with the client 14. As known in the art, the activity monitor 38 may not have to monitor the keyboard 74 and mouse 70 drivers directly. In another embodiment, the activity monitor 38 monitors the screensaver API, which is informed of keyboard 74 and mouse 70 inactivity after a period of time. In another embodiment, the activity monitor 38 is sent keyboard 74 and mouse 70 events directly by the operating system.

In an embodiment where there is not an external resource monitoring keyboard 74 and mouse 70 activity, the activity monitor 38 must time the period of inactivity. When the keyboard 74 and mouse 70 become inactive, the activity monitor 38 starts a timer. The timer simply counts up, over time, clock pulses or other accepted periodic increments, until it reaches a predetermined maximum value. In another embodiment, the timer may start at the maximum value and count down. If at any time while the timer is counting, the activity monitor 38 detects user interaction, the timer will be reset to the initial state (e.g., zero or the maximum value). Once the timer counts up to the predetermined maximum value, or counts down to zero, the activity monitor 38 generates a notification of change of activity and transmits the notification to the server 18 as described above. In this case, the notification represents user inactivity. In one embodiment, if the operating system of the client 14 is monitoring for a period of inactivity, the activity monitor 38 can set the user selectable period of time in the operating system to the predetermined maximum value.

Subsequent to transmitting the notification of change of activity, the activity monitor 38 continues monitoring the keyboard 74 or mouse 70 for the resumption of user activity. When the user becomes active again (e.g., the activity monitor 38 detects a driver in use), the activity monitor 38 generates a notification of change of activity and transmits the notification to the server 18 as described above. In this case, the notification represents user activity.

In another embodiment the activity monitor 38 monitors the display 66 of the client 14 and detects when a system screensaver is initiated. The mechanism to detect the screensaver initialization is specific to the operating system (e.g., WINDOWS® of Microsoft Corp. of Redmond, Wash., X of X.org for Unix® of The Open Group of Woborn Mass.) of the client 14 and is well documented for each of the operating systems. When the system screensaver initiation is detected, the activity monitor 38 generates a notification of change of activity and transmits the notification to the server 18 as described above. In this case, the notification represents user inactivity. When the system screensaver is terminated, the activity monitor 38 generates a notification of change of activity and transmits the notification to the server 18 as described above. In this case, the notification represents user activity.

In some cases, a typical user response is to move the mouse 70 immediately after the screensaver is initiated, thus terminating the screensaver. With this response, a notification representing user activity is sent immediately after a notification representing user inactivity. This unnecessarily uses communication channel 22 and server 18 resources. In one embodiment, to prevent this use of resources the activity monitor 38 waits a predetermined small amount of time after the screensaver is initiated before transmitting the notification representing user inactivity.

When a screensaver is used, there are many different sources that can provide the screensaver. In one embodiment, the screensaver that is displayed on the display 66 of the client 14 is a display provided by the operating system of the client 14. In another embodiment, the screensaver that is displayed on the display 66 of the client 14 is a display that is generated by the activity monitor 38. This screensaver can provide status information to the user. In yet another embodiment, the screensaver that is displayed on the display 66 of the client 14 is a display transmitted by the display generator 84 of the server 18. The display can be indicative to the user of an idle server connection to remind the user that a server connection still exists but is at a reduced allocation of resources. The display generator 84 can be a simple storage device storing a graphic image to be displayed. The display generator 84 can be an additional application that generates advertisements based on the services that the server 18 is providing for the client 14.

In another embodiment, the activity monitor 38 monitors other detection means 78 to determine user activity. These other detection means 78 can include technologies that detect whether there is user is physically at the client 14. For example other detection means 78 can include infrared detection of user's body temperature or video detection using a digital video camera in combination with image recognition software or motion detection. When other detection means 78 is used, the activity monitor 38, in one embodiment, uses the same inactivity timer as described above, to count a period of inactivity prior to transmitting a notification.

On the server 18, the resource manager 30 receives the notification from the client 14 and takes action in response to this notification. The exact action that the resource manager 30 takes is dependent on the services that the server 18 is providing for that particular client 14. If the resource manager 30 receives a notification indicating user inactivity, the resource manager will start reducing some or all of the allocated resources for that client 14. The means for transmitting the notification varies with the protocol of the communication channel 22 between the client 14 and server 18. If the protocol does not support the notification, the client 14 can initiate a second communication channel 22' (not shown) specifically for the notification transmissions, using a protocol that supports the notification (e.g., a simple HTTP connection).

One of the services the server 18 provides to the client 14 can be, for example, the execution of an application 94. In one embodiment, the application 94 is of no use to the user once he or she leaves the client 14. In this embodiment, the resource manager 30 terminates the execution of that application 94 in response to the notification.

In another embodiment, the application 94 is of no use to the user while he or she is not interacting with the client 14, but the user will want to resume the application at the point in the execution of the application where they left off. In this embodiment, the resource manager 30 suspends the execution of that application 94 in response to the notification, and upon suspension, stores the state of the application in the storage buffer 80. This suspension allows the server CPU 88 resources that were needed for execution of the application 94 to be used for other services. Upon a subsequent notification from the client 14 representing user activity, the resource manager 30 retrieves the state of the application 94 from the storage buffer 80 and resumes execution of the application 94 at the stored state. This resumption requires the resumption of the server CPU 88 resources needed for execution of the application 94.

In another embodiment, the application 94 the user wants the output of the application 94 while he or she is not interacting with the client 14. In this embodiment, the resource manager 30 terminates transmitting the output of that application 94 to the client 14 in response to the notification representing user inactivity. Instead, the output of the application is stored in the storage buffer 80. This frees up resources on the communication channel 22 for other clients in the network while the client is not interacting with the client 14. Upon a subsequent notification from the client 14 representing user activity, the resource manager 30 retrieves the stored output from the storage buffer 80 and transmits the stored output data to the client 14. In another embodiment, the stored output is compressed to save on transmission resources. In another embodiment, the output data is limited to the most current display 66 at the time when the output data is re-transmitted to the client 18. In this case, the storage buffer 80 is limited to the size of the display 66. Each new piece of output overwrites the data in the storage buffer 80 that corresponds with the portion of the display 66 that has changed.

In another example, another service the server 18 provides to the client 14 can be maintaining the communication channel 22 between the client 14 and the server 18. In one embodiment, the resource manager 30, upon notification representing user inactivity, reduces resources dedicated to maintaining communication between the client 14 and the server 18, but leaves the communication channel 22 connected. The resource manager 30 instructs the communications channel 22 that the connection is of low priority. For example, in one embodiment the communication channel includes a transmission mechanism that controls and reduces the amount of bandwidth consumed (e.g., Internet Protocol, Quality of Service). In another embodiment, the resource manager 30 sends signals to the communication channel 22 hardware (e.g., routers manufactured by Cisco Systems, Inc. of San Jose, Calif.) to de-prioritize the transmission stream. In another embodiment, the communication channel 22 provides a low level priority or Quality of Service, so that when designated as such by the resource manager 30, the transmission occurs only when there is nothing else being transmitted on the communication channel 22.

In another embodiment, the resource manager 30 or the activity monitor 38 disconnects the connection subsequent to the notification of change of activity representing user inactivity. In this embodiment, the server 18 and the client 14 engage in an interchange prior to disconnecting the connection. For example, the interchange can be the exchange of state information to aid in the reconnection. In one embodiment, the activity monitor 38 can store this state information a client storage area (not shown). In another embodiment, the resource manager 30 can store this state information in the storage buffer 80. In another example, the interchange can be the exchange of protocol specific information to synchronize an asynchronous protocol. When the communication channel 22 is disconnected, the client 14 typically initializes the re-establishment of the connection, due to firewall security schemes. In other embodiments however, the server 18 can re-establish the connection. For example, the server 18 can use a third party to request that the client 14 re-establishes the communication channel 22.

Figure 3:
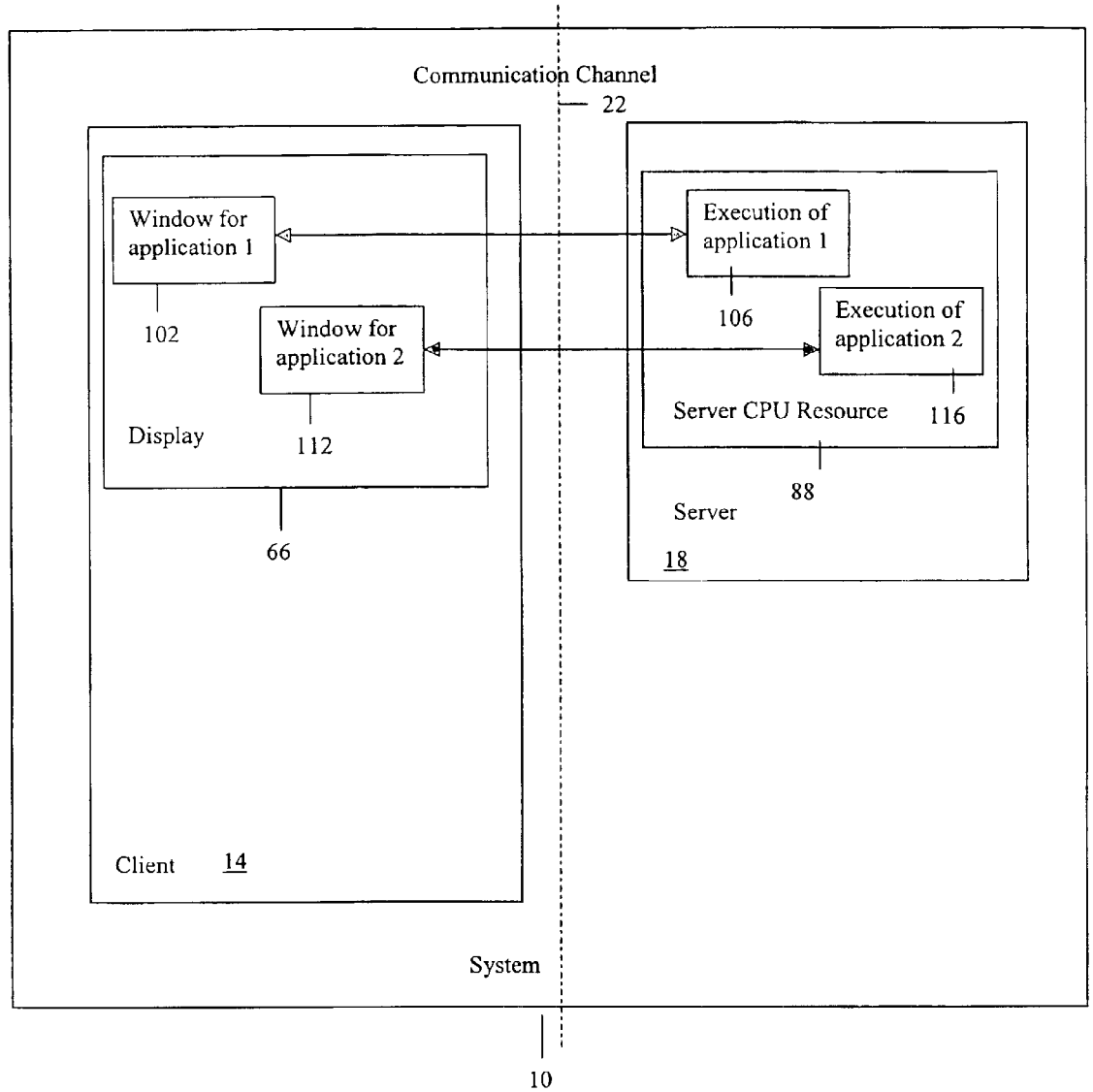
FIG. 3 is a block diagram of another embodiment of the invention in which the client monitors multiple applications independently.

FIG. 3 depicts an exemplary embodiment of a system 10 in which the server 18 is executing two applications for the client 14. The output of each application is displayed in a separate application window 102, 112 on the client display 66. In this embodiment, each application window 102, 112 has a separate screensaver with which it is associated. The activity monitor 38 (FIG. 2) monitors each application window separately. When the user stops interacting with an application window 102, 112, the activity monitor 38 (FIG. 2) starts a timer, as described above, for that particular application window.

For example and illustration purposes, the user is only interacting with the application window 102 associated with executing application one 106. Since the user is not interacting with the application window 112 associated with executing application two 116 the activity monitor 38 (FIG. 2) starts counting, as described above. Once the timer reaches a predetermined value, a screensaver is initiated for that specific application window 112. The activity monitor 38 (FIG. 2) transmits a notification of change of activity associated with that specific application 116. In one embodiment, the screensaver that is displayed on the application window 112 associated with executing application two 116 is a display transmitted by the display generator 84 (FIG. 2) of the server 18. As described above, the display can be indicative to the user of reduced allocation of server resources for application two 1 16 or advertisements related to the application two 116. The resource manager 30 (FIG. 2) reduces resources allocated for that specific application two 116. For some examples, as described above the resource manager 30 (FIG. 2) can terminate execution of the application 116, save the current state of the application 116 or save the output of the application 116 to a storage buffer 80 (FIG. 2).

FIG. 4 depicts an exemplary embodiment of a process by which a client 14 (FIG. 2) monitors for a change in activity level, notifies the server 18 (FIG. 2) of the change in activity level and the server 18 reacts in response to the change in client activity level. The client 14 transmits (step 10) over the communication channel 22 (FIG. 2) from the client communication link 34 (FIG. 2) to the server 18 a request to execute an application 94 (FIG. 2). The server communication link 26 (FIG. 2) receives (step 14) the request and the server 18 executes (step 18) the requested application 94. As the application 94 creates output data, the application transmits the output data to the server communication link 26 (FIG. 2). The embodiment of FIG. 2 depicts the output data flowing through the resource manager 30 (FIG. 2). This is shown so the resource manager 30 can intercept data to store in the storage buffer 80 (FIG. 2). However, in other embodiments, this can be accomplished in other structures. For example, the output data can flow directly from the application 94 to the server communication link 26 and the resource manager 30 intercepts the output data from the server communication link 26. In another example, the output data can flow from the CPU 88 (FIG. 2), which is executing the instructions of the application 94 to the server communication link 26.

The sever communication link 26 transmits (step 22) the output data to the client 14. The client communication link 34 receives (step 26) the output data and displays (step 30) the output data on the client display 66 (FIG. 2). If there is more than one application window (e.g., the application windows 102 and 112 depicted in FIG. 3), the output data is displayed in the application window associated with the executing application 94.

The server 18, in a continuous loop, executes (step 18) the application 94 and transmits (step 22) output data the application 94 generates until the client 14 sends a notification of change of user activity. In the depicted embodiment, the client 14 activity monitor 38 (FIG. 2) determines (step 34) whether the system screensaver has been activated. If it has, this indicates that the user has been inactive for a predetermined amount of time. The client 14 transmits (step 38) to all of the servers with which the client 14 is in communication a notification of change of activity representing user inactivity. If the system screensaver is not activated, the client 14 activity monitor 38 determines (step 42) whether a specific application window screensaver has been activated. If it has, this indicates that the user has not interacted with that particular application window for a predetermined amount of time. The client 14 transmits (step 46) to the server executing that application a notification of change of activity representing user inactivity with that respective application. If a specific application window screensaver has not been activated, the client 14, in a continuous loop, receives (step 26) and displays (step 30) output data and determines whether the system (step 34) or an application window (step 42) screensaver has been activated.

In some embodiments where the screensaver is used to monitor for inactivity, the screensaver will not be initiated as long as the server 18 is transmitting data to be displayed on the display 66 of the client 14. In one of these embodiments, the activity monitor 38 forces the screensaver to be initiated when the inactivity period has been reached. For example, the activity monitor 38 can monitor the keyboard 74 or the mouse 70 or the other detection means 78 as described above, in parallel to monitoring the system screensaver. The determination of whether to override the system screensaver can be made by the activity monitor 38 or the resource manager 30. The determination can take into account who is providing the screensaver and whether the application 94 is a type that requires user interaction or physical presence.

When the server 18 receives the notification of change of activity representing user inactivity, the server manages (step 50) the resources associated with the specific inactive application(s). In the depicted embodiment, the server 18 determines (step 54) whether the server 18 should continue executing the application 94. If the server 18 terminates execution, the server stores (step 58) the current state of the application 94 in a storage buffer 80. If the server 18 continues executing the application 94, the server determines (step 62) whether the client 14 needs the output data generated while the user is inactive. If the client 14 does need the data, the server 18 stores (step 64) all of the generated output data in a storage buffer 80. If the client 14 does not need the data, the server 18 discards all of the generated output data until the server receives another notification representing user activity.

Subsequent to a screensaver becoming active, the client 14 activity monitor 38 determines (step 70) whether the user inactivity has ended. For example, whether the screensaver has been deactivated. If the user inactivity has not ended, the activity monitor continues monitoring. If the user inactivity has ended, the client 14 re-establishes (step 74) communication with the server 18. As described above, this can entail anything from simply transmitting over the communication channel 22, which remained open during inactivity, to re-establishing a connection with the server 18. Subsequent to re-establishing communication with the server 18, the client 14 transmits a notification of change of activity representing user activity. In response to the notification, the server 18 resource manager 30 manages the resources. In this case where the notification represent user activity, the resource manager 30 re-establishes (step 78) resources necessary to provide the prior requested (step 10) services. For example, this can include obtaining the state of the application from the storage buffer 80 and beginning execution of the application 94 at that state. This can also include obtaining (step 82) the output data stored (step 64) in the storage buffer 80. The server 18 transmits (step 22) this stored output data to the client 14 and continues executing (step 18) the application 94.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for managing network resources, the method comprising:

allocating at least one resource on a server to the provision of a service to a user of a client;

monitoring activity of a user at said client to detect a change in the level of user's activity;

transmitting, in response to user inactivity, from said client a notification of change in activity level to said server; and terminating transmission of output data to said client associated with an application executing on said server in response to said notification;

storing said output data in a storage area following said notification; and transmitting said stored output data to said client in response to a subsequent notification of change of activity.

2. The method of claim 1 wherein the step of terminating transmission comprises the step of suspending execution of the application executing on the server.

3. The method of claim 1 further comprising storing the state of the at least one allocated resource such that resumption occurs at substantially said same state in response to a subsequent notification of change of activity.

4. The method of claim 1 further comprising displaying a predefined display on said client following detection of a change in the level of user activity.

5. The method of claim 4 further comprising transmitting from said server to said client said predefined display.

6. The method of claim 1 wherein an allocated resource on said server is CPU time.

7. The method of claim 1 wherein an allocated resource is bandwidth in the network communication channel associated with maintaining communication between said server and said client.

8. The method of claim 1 wherein terminating transmission of output data to said client comprises:

terminating communication with said client.

9. The method of claim 8 further comprising:

transmitting from said client a second notification of change in activity level to said server; and re-establishing communication between said client and said server.

10. The method of claim 9 wherein the re-establishment of said communication between said client and said server is initiated by said client.

11. A system for managing resources, the system comprising:

a server comprising:

a resource manager allocating a resource in the provision of a service to a user of a client;

a server communication link in communication with said resource manager; a first storage buffer in communication with said resource manager; and a client in communication with said server, said client comprising:

an activity monitor; and a client communication link in communication with said activity monitor, wherein said activity monitor detects a level of activity of a user on said client and in response to a change in said level of activity transmits over said communication link a notification of change of activity to said server; and wherein said resource manager, in response to said notification, stores output data generated by an application in said first storage buffer in response to said notification.

12. The system of claim 11 wherein said notification of change of activity represents user inactivity.

13. The system of claim 12 wherein said server further comprises:

a server display generator in communication with said resource manager, wherein said display generator produces a display which said server transmits to said client and wherein said client displays said display following detection of a change in the level of activity.

14. The system of claim 12 wherein said client communication link initiates re-establishing communication with said server in response to said notification.

15. The system of claim 11 wherein allocated resource on said server is CPU time.

16. The system of claim 11 wherein said server transmits said output data stored in said first storage buffer to said client in response to a subsequent notification of change of activity level.

17. The system of claim 11 wherein said server further comprises:

a server second storage buffer in communication with said resource manager, wherein said server stores the state of said at least one allocated resource when said notification is received, for resumption at substantially same said state in response to a subsequent notification of change of activity.

18. The system of claim 11 wherein said resource manager terminates communication with said client.

19. The system of claim 11 wherein said resource manager terminates transmission of application output to said client.

20. The system of claim 11 wherein said resource manager suspends execution of the application.

21. A server for managing resources allocated to an external client, the server comprising:

a resource manager;

a communication link in communication with said resource manager; and a first storage buffer in communication with said resource manager, wherein said resource manager, in response to a notification of change of activity from an external client received over the communication link, stores application output data generated by an application in said first storage buffer.

22. The server of claim 21 wherein said notification of change of activity represents user inactivity.

23. The server of claim 21 wherein the allocated resource is CPU time.

24. The server of claim 21 wherein said server transmits said application state stored in said storage buffer to said external client in response to a subsequent notification of change of activity.

25. The server of claim 21 wherein said server further comprises:
   a storage buffer in communication with said resource manager,
   wherein said server stores the state of said at least one allocated resource in said storage buffer, such that when subsequent notification is received in response to a change of activity, resumption occurs at substantially said same state.

26. The server of claim 21 wherein said server further comprises: a server display generator in communication with said resource manager, wherein said display generator produces a display which said server transmits to an external client for displaying following detection of a change in the level of activity.

27. The server of claim 21 wherein said resource manager terminates communication with said external client.

28. The server of claim 21 wherein said resource manager terminates transmission of application output to said external client.

29. The server of claim 21 wherein said resource manager suspends execution of the application.

* * * * *